United States Patent

Horneber

(10) Patent No.: US 7,505,211 B2
(45) Date of Patent: Mar. 17, 2009

(54) PHOTOGRAPHIC WIDE ANGLE ZOOM OBJECTIVE OF THE RETROFOCUS TYPE

(75) Inventor: Christoph Horneber, Nürnberg (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 11/854,153

(22) Filed: Sep. 12, 2007

(65) Prior Publication Data

US 2008/0068726 A1    Mar. 20, 2008

(30) Foreign Application Priority Data

Sep. 18, 2006   (DE) ................. 10 2006 044 355

(51) Int. Cl.
*G02B 15/14* (2006.01)
(52) U.S. Cl. .................... 359/680; 359/681; 359/691
(58) Field of Classification Search ................. 359/680, 359/681, 682, 691
See application file for complete search history.

(56) References Cited

U.S. PATENT DOCUMENTS

| | | | |
|---|---|---|---|
| 4,173,395 A | | 11/1979 | Kobayashi |
| 4,406,523 A | * | 9/1983 | Sato et al. ............ 359/680 |
| 6,417,972 B1 | * | 7/2002 | Chung et al. .......... 359/663 |
| 6,943,958 B2 | * | 9/2005 | Ozaki et al. .......... 359/680 |
| 7,177,090 B1 | * | 2/2007 | Arai et al. ............ 359/680 |

| | | |
|---|---|---|
| 2003/0234985 A1 | 12/2003 | Sato |

FOREIGN PATENT DOCUMENTS

| | | |
|---|---|---|
| DE | 28 13 929 A1 | 10/1978 |
| DE | 221 570 A1 | 4/1985 |

* cited by examiner

*Primary Examiner*—David N Spector
(74) *Attorney, Agent, or Firm*—Foley & Lardner LLP

(57) ABSTRACT

Photographic wide angle zoom objective of the retrofocus type having a group of negative refractive power (VG−) comprising four lens components (L1, L2, L3, L4) and being a front group when seen from the object side, and having a rear group of positive refractive power (HG+) including six lens components (L5, L6, L7, L8, L9, L10) and facing an image plane, the distance between the rear group (HG+) and the image plane (BE) being increased, and the distance between the front group (VG−) and image plane (BE) being reduced, during an increase in the focal length, characterized in that the first two lens components (L1, L2) have a negative refractive power when seen from the object side in the light direction, the third and fourth lens components (L3, L4) are grouped into a cemented component with a positive total refractive power and the fifth lens component (L5) has a positive refractive power, the sixth and seventh lens components (L6, L7) are grouped into a cemented component with a positive total refractive power, the eighth and ninth lens components (L8, L9) are grouped into a cemented component with a negative total refractive power, and the tenth lens component (L10) has a positive refractive power.

16 Claims, 1 Drawing Sheet

PHOTOGRAPHIC WIDE ANGLE ZOOM OBJECTIVE OF THE RETROFOCUS TYPE

CROSS-REFERENCE TO RELATED PATENT APPLICATIONS

The right of foreign priority is claimed under 35 U.S.C. §119(a) based on Federal Republic of Germany Application No. 10 2006 044 355.1, filed Sep. 18, 2006, the entire contents of which, including the specification, drawings, claims and abstract, are incorporated herein by reference.

BACKGROUND OF THE INVENTION

The invention relates to a photographic wide angle zoom objective of the retrofocus type.

Photographic objectives of the retrofocus type have a lens group of negative refractive power, being a front group when seen from the object side, and a lens group of positive refractive power, being a rear group when seen from the object side. Objectives of the retrofocus type are also denoted as being of the inverted teleobjective type. In the case of these objectives, the aperture stop is usually arranged between the front group and the rear group, or inside the rear group.

SUMMARY OF THE INVENTION

DD 221 570 A1 discloses a photographic wide angle objective of the retrofocus type having a fixed focal length and a field angle greater than 90°. The relative aperture is greater than 1:1.28. The objective has a design comprising a total of 11 lenses consisting of 7 individual lenses and 2 cemented components respectively including 2 lenses.

A wide angle objective of the retrofocus type is likewise disclosed in DE 28 13 929 A1. The objective described there has a relative aperture of 1:3.5-4.0 and an angular aperture of 80°. The lens system has nine lenses which are grouped into eight lens components. The objective has a rear back focus which corresponds to approximately 1.3 to 1.4 times the focal length, and is therefore suitable, for example, for use on mirror reflex cameras, in the case of which sufficient space must be present for the mirror boxes between the objective bayonet, and thus the last lens of the objective, and the image plane in the camera.

US 2003/0234985 A1 discloses an objective, denoted as a super wide angle zoom objective, having a front group (G1) of negative refractive power and a rear group (G2) of positive refractive power. The design therefore corresponds to the retrofocus type. In this objective, the aperture stop is arranged inside the rear group. During a variation in the focal length from 12.3 mm to 23.3 mm the distance between the rear group and image plane increases, while the distance between the front group and image plane simultaneously decreases. The objective has eleven lenses in seven groups. Seen from the object plane, the lens groups have the following refractive power sequence (−−+,+++−). The first lens of the front group is designed as a negative meniscus with surfaces which are aspheric on both sides, and the second lens component consists of an aspheric lens element which is fabricated from glass in combination with plastic. Both lens elements are expensive to produce. The third lens element of the front group is a positive meniscus whose convex surface faces the object plane.

The positive first lens component of the rear group is configured as a cemented component with a refractive power sequence of the two lens elements of (−+), and is supported displaceably along the optical axis for focusing purposes. The aperture stop is arranged between this first and the second, likewise positive, lens group, which is designed as a cemented component with the refractive power sequence (+−). The third lens group of the rear group is likewise designed as a cemented component and has the refractive power sequence (−+). The last lens element of the rear group is a negative meniscus with a convex surface facing the image plane, and surfaces which are aspheric on both sides.

The objective is complicated to fabricate, and the five aspheric surfaces on three lenses and/or lens elements are expensive to produce. In particular, aspheric surfaces provided on both sides of lenses throw out problems in production. Moreover, these surfaces are very susceptible to tilting and centering errors, and therefore lead to an increased outlay on mounting.

Embodiments of the invention provide a photographic wide angle objective having a large angular field and a variable focal length f between 16 mm and 21 mm, an aperture of 1:4.0 and an improved imaging performance in the near field up to approximately 0.50 m object distance. These embodiments reduce the production costs by diminishing the number of the aspheric surfaces, provide aspheric surfaces as far as possible only on one side of the lens, and shape the latter as far as possible such that it can be produced cost-effectively.

It is to be borne in mind in relation to the features of the solution specified in the claims that it is usual to make use in modern optical design of automatic correction programs such as, for example "code V" from the Optical Research Association, which are capable of using prescribed lens sequences and refractive power distributions to calculate proposals for functional objective systems with a correction state optimized for a specific task. The automatically achieved correction state is respectively further improved on the basis of targeted variations in individual parameters by the optical designer.

It is already possible in this way to obtain the design data for radii, lens thicknesses, lens separations, refractive indices and Abbe numbers of the optical lenses to be used with the aid of the features described herein. The design parameters can be improved in stepwise and targeted fashion by taking account of the features specified herein.

Further features and advantages of the present invention will become apparent from the detailed description of preferred embodiments that follows, when considered together with the accompanying figures of drawing.

BRIEF DESCRIPTION OF THE DRAWINGS

An exemplary embodiment of the inventive objective is illustrated diagrammatically in the drawing, in which.

DETAILED DESCRIPTION OF THE PREFERRED EMBODIMENTS

Figure 1A:
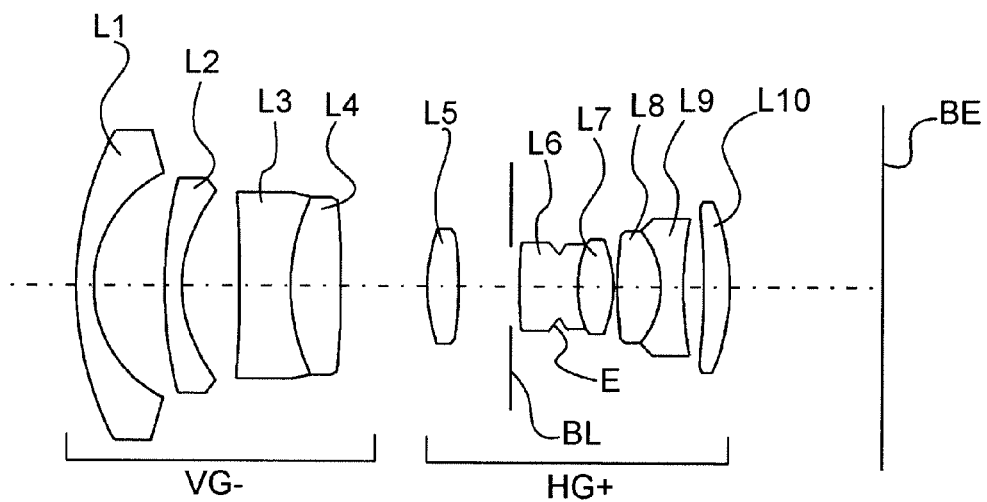
FIG. 1a shows the lens section through a wide angle zoom objective in the position with focal length f=16 mm.
Figure 1B:
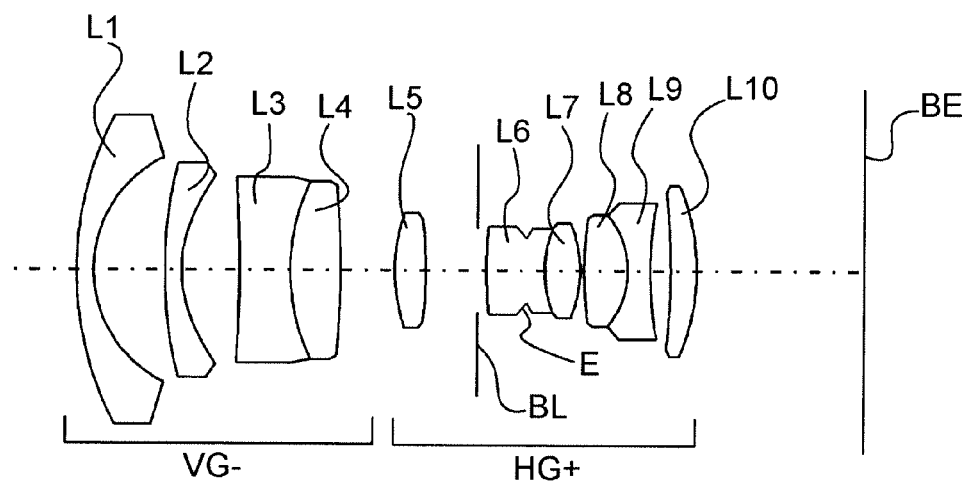
FIG. 1b shows the same lens section in the position with focal length f=18 mm.
Figure 1C:
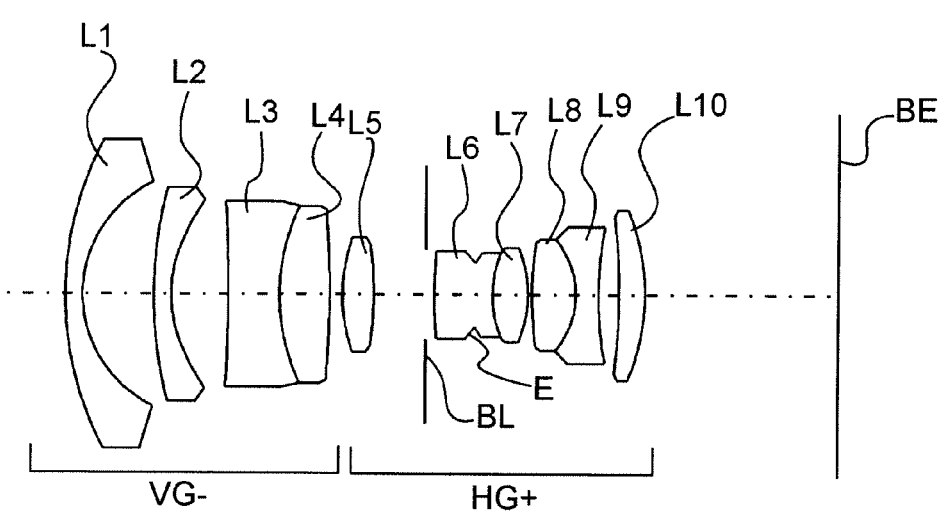
FIG. 1c shows the lens section in the position with focal length f=21 mm.

In the case of the objective according to FIGS. 1(a-c), the front group (VG−) consisting of four lens components (L1-L4) has a negative refractive power, and the rear group (HG+) consisting of six lens components (L5-L10) has a positive refractive power. The front group (VG−) and the rear group (HG+) move up to one another when the focal length varies from, for example, f=16 mm (FIG. 1a) to f=21 mm (FIG. 1c), while the distance of the rear group (HG+) from an image plane (BE) simultaneously increases. An aperture stop (BL) is arranged between the fifth lens (L5) and the cemented component (L6, L7).

The front lens (L1) is designed as a convex/concave meniscus of negative refractive power made from a high index glass (n>1.80), and preferably has a partial focal length of f=−31 mm. The second lens (L2) of the front group (VG−) is likewise a convex/concave meniscus with a negative refractive power and is fabricated from a glass in the mid refractive index range (1.5<n<1.75). It has, for example, a partial focal length of f=−30 mm. The shape of the lens components (L1, L2) renders possible a relatively large diameter which is advantageously suitable for acquiring a large object angle or image angle of, for example, greater than 100°, preferably 107°.

The retrofocus design with front lenses of negative refractive power (L1, L2) causes a large distortion in the image plane, however. In order to eliminate these image defects, the invention provides a lens with at least one aspheric surface in the front group (VG−). In a particularly advantageous way, the aspheric surface is provided far to the front, that is to say at the first lens (L1) or the second lens (L2). It is possible in this way to correct distortion defects particularly effectively. However, since aspheric lenses with a large diameter are difficult to fabricate and are therefore expensive, the aspheric surface is arranged with particular advantage on the concave side of the second lens (L2). A good compromise between size of the aspheric lens and costs of producing it is realized in this way.

The third lens component (L3) of the front group (VG−) has a negative refractive power and is made from low index glass (n<1.60). The fourth lens component (L4) is fabricated from high index glass (n>1.80), and has a positive refractive power. It is true that in the case of a design as two individual lenses (L3) and (L4) the optical designer is advantageously offered additional degrees of freedom in the front group (VG−) for correction by means of variations in radius and distance, but it is known that distance errors and thickness errors produce defects lying symmetrically in the image field, while centering errors of the centers of the lenses produce mutually asymmetric image defects. Consequently, the third and fourth lenses are advantageously grouped as a cemented component (L3, L4). In this way, there is a reduction in the tolerance sensitivity to distance, thickness and centering errors during fabrication and mounting. Modern fabrication methods for cemented components exclude centering errors between the cemented lenses. It is thereby possible to support the cemented component (L3, L4) displaceably along the optical axis for focusing purposes. It is particularly important to eliminate possible centering errors when the focusing component is not displaced axially by a rectilinear guide, but is, for example, guided rotatably in a worm guide. The partial focal length of the cemented component (L3, L4) is 62 mm, for example.

The lens component (L5) which is arranged very close to the aperture stop (BL) and designed as a biconvex lens made from low index glass (n<1.60) and having an aspheric surface on the light entrance side is advantageous. Low index glass is particularly well suited for producing pressed aspheres, which can be produced cost-effectively. The very strong influence on astigmatism and field curvature which is produced because of the aspheric surface can advantageously be used for correction purposes. The lens component has, for example, a partial focal length of f=28 mm.

The sixth lens component (L6) has a high index glass (n>1.80), and is grouped as cemented component (L6, L7) with the seventh lens component (L7), which has a anomalous partial dispersion and a high Abbe number (v>65). It is possible in this way for spherical errors and the coma to be particularly effectively corrected as far as into the edge region of the image field. The partial focal length f of the cemented component (L6, L7) is 52 mm, for example.

Furthermore, according to the invention it is possible to provide at the outer circumference of the sixth lens component (L6) a wedge-shaped recess (E) of defined depth for the purpose of increasing the imaging performance specifically in the middle image field zone. In order to be able to additionally vignette image field zones selectively with particular effectiveness, the recess is lined with black paint.

The glasses used in the first two lens groups (L1, L2), which are in the mid and higher range of refractive index, have a low Abbe number, and therefore cause a relatively high cover dispersion. Glasses with abnormal partial dispersion are used with particular advantage for correcting the color distortion in the seventh, eighth and ninth lens components (L7, L8, L9). For the purpose of particularly effective correction of the chromatic aberration, lens components eight and nine are made from glasses with a highly abnormal partial dispersion and grouped as a cemented component (L8, L9) with a negative partial focal length of f=−22 mm, for example.

In order to produce the largest distance possible between the exit pupil and the image plane (BE), the tenth lens component (L10) is designed as a concave/convex lens of positive refractive power and, in addition, advantageously influences the distortion correction. The partial focal length of the tenth lens component (L10) is f=44 mm, for example. The displacement of the exit pupil causes the marginal rays to fall at a steeper angle onto the image plane (BE), the result being to avoid additional image defects, in particular in the case of digital imaging.

A known problem in the focusing of a wide angle objective is image defects that frequently occur in an intensified fashion in the near field as a consequence of a system having induced field curvature. At shorter focal lengths, it becomes ever more difficult to compensate these image defects occurring in the near field. Consequently, the cemented component (L3, L4), which serves the purpose of focusing, as already mentioned, is advantageously corrected in such a way that during focusing in the near field, its influence on the field curvature of the overall system counteracts a field curvature caused by its adjustment in the overall system. In addition, the cemented component (L3, L4) can be arranged on a special mount part, which can be displaced relative to the mount of the remaining lens components, for the purpose of varying the distance when conducting close-up focusing. The air separation between the cemented component (L3, L4) and the preceding lens component (L2) can be adjustable in order to improve the fabrication of the objective and can thus be used as the setting distance. By varying the setting distance, it is possible to compensate fluctuation in the field curvature caused by manufacturing tolerances. In the case of the present objective, at the end of the mounting operation the symmetrical tolerances, caused by fabrication, of the radii, thicknesses and separations of the lens components already inserted into the mount can be compensated by targeted variation of the distance.

The inventive wide angle zoom objective has a number of, preferably three, lockable focal length settings for particular use on measuring viewfinder cameras with discrete mask frames. In this case, the correction for these discrete focal lengths can be further optimized in a targeted fashion, since, as with conventional, continuously adjustable zoom objectives, no use is made of intermediate focal lengths.

When use is made of the objective on a digital measuring viewfinder camera with an image sensor which is smaller than the conventional miniature size, the object angles which belong to the focal lengths f=16 mm, 18 mm and 21 mm are reduced to values which correspond, for example, to the focal lengths f=21 mm, 24 mm and 28 mm (35 mm equivalent focal length). A separate slip-on viewfinder can be used in this way for the focal length f=21 mm, both on an analog and on a digital measuring viewfinder camera.

The above-named measures can be used to implement an exceptionally compact wide angle zoom objective which can be produced cost-effectively by using only two aspheric lenses, and exhibits outstanding imaging performance even in the near field of 0.5 m object distance, owing to the specific internal focusing and correction of the focusing component.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

LIST OF REFERENCE SYMBOLS

L1 to L10 first to tenth lens components
L3, L4 cemented component of third and fourth lens components
L6, L7 cemented component of sixth and seventh lens components
L8, L9 cemented component of eighth and ninth lens components
VG− front group
HG+ rear group
BL aperture stop
E recess
BE image plane

What is claimed is:

1. Photographic wide angle zoom objective of the retrofocus type having a group of negative refractive power comprising four lens components and being a front group when seen from the object side, and having a rear group of positive refractive power including six lens components and facing an image plane, the distance between the rear group and the image plane being increased, and the distance between the front group and image plane being reduced, during an increase in the focal length, wherein the first two lens components have a negative refractive power when seen from the object side in the light direction, the third and fourth lens components are grouped into a cemented component with a positive total refractive power and the fifth lens component has a positive refractive power, the sixth and seventh lens components are grouped into a cemented component with a positive total refractive power, the eighth and ninth lens components are grouped into a cemented component with a negative total refractive power, and the tenth lens component has a positive refractive power.

2. Photographic wide angle zoom objective according to claim 1, wherein the first lens component is designed convex/concave as a meniscus and has a high refractive index glass (n>1.80).

3. Photographic wide angle zoom objective according to claim 1, wherein the second lens component is designed convex/concave as a meniscus with an aspheric surface on the concave side, and has a glass with a mid range refractive index (1.5<n<1.75).

4. Photographic wide angle zoom objective according to claim 1, wherein the lens component of a cemented component is of negative refractive power and made from low refractive index glass (n<1.60), and the fourth lens component has a positive refractive power and is made from high refractive index glass (n>1.80), the cemented component being supported displaceably along the optical axis for focusing purposes.

5. Photographic wide angle zoom objective according to claim 1, wherein an aperture stop is arranged in the rear group between the fifth and sixth lens components.

6. Photographic wide angle zoom objective according to claim 1, wherein the fifth lens component is designed as a biconvex lens made from low refractive index glass (n<1.60) and having an aspheric surface on the light entrance side.

7. Photographic wide angle zoom objective according to claim 1, wherein the sixth lens component has a high refractive index glass (n>1.80) and is provided with a wedge-shaped recess, integrally formed on the outer circumference, of defined depth for the purpose of defined vignetting.

8. Photographic wide angle zoom objective according to claim 7, wherein the wedge-shaped recess is lined with black paint.

9. Photographic wide angle zoom objective according to claim 1, wherein the seventh lens component has an abnormal partial dispersion and a high Abbe number (v>65).

10. Photographic wide angle zoom objective according to claim 1, wherein the eighth lens component is designed as a positive lens of high Abbe number (v>65) with an abnormal partial dispersion, and the ninth lens component is designed as a negative lens with a high refractive index (n>1.80) and abnormal partial dispersion.

11. Photographic wide angle zoom objective according to claim 4, wherein a cemented component is corrected such that, during focusing in the near field, its influence on the field curvature of the overall system counteracts a field curvature caused by its adjustment in the overall system.

12. Photographic wide angle zoom objective according to claim 1, wherein the objective has a variable focal length of 16 mm to 21 mm and relative aperture of 1:4.0.

13. Photographic wide angle zoom objective according to claim 1, wherein the objective has a number of discrete lockable focal length settings.

14. Photographic wide angle zoom objective according to claim 13, wherein lockable focal length settings are assigned to a mask frame of a viewfinder system and correspond to the focal lengths f=16 mm, 18 mm and 21 mm.

15. Photographic wide angle zoom objective according to claim 14, wherein the lens components have the following values ±5% of partial focal lengths

| | |
|---|---:|
| first lens component = | −31 mm |
| second lens component = | −30 mm |
| third and fourth lens components = | 62 mm |
| fifth lens component = | 28 mm |
| sixth and seventh lens components = | 52 mm |
| eighth and ninth lens components = | −22 mm |
| tenth lens component = | 44 mm. |

16. Photographic wide angle zoom objective according to claim 13, wherein the number of discrete lockable focal length settings is three.

* * * * *